(12) United States Patent
Sivaraman

(10) Patent No.: US 9,607,369 B2
(45) Date of Patent: Mar. 28, 2017

(54) MOTION AND FOCUS BLUR REMOVAL FROM PATTERN IMAGES

(71) Applicant: KLA-Tencor Corporation, Milpitas, CA (US)

(72) Inventor: Ram Sivaraman, Dublin, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 241 days.

(21) Appl. No.: 14/537,535

(22) Filed: Nov. 10, 2014

(65) Prior Publication Data

US 2015/0131893 A1    May 14, 2015

Related U.S. Application Data

(60) Provisional application No. 61/904,366, filed on Nov. 14, 2013.

(51) Int. Cl.
| | |
|---|---|
| G06K 9/00 | (2006.01) |
| G06T 7/00 | (2017.01) |
| G06T 5/00 | (2006.01) |
| G06T 5/20 | (2006.01) |

(52) U.S. Cl.
CPC ............ *G06T 7/0004* (2013.01); *G06T 5/003* (2013.01); *G06T 5/20* (2013.01); *G06T 2207/30148* (2013.01)

(58) Field of Classification Search
CPC ...... G06T 2207/30148; G03F 7/70616; G01N 21/9501
See application file for complete search history.

(56) References Cited

U.S. PATENT DOCUMENTS

| | | | | |
|---|---|---|---|---|
| 5,475,766 | A * | 12/1995 | Tsuchiya | G01N 21/8851 345/441 |
| 5,825,482 | A * | 10/1998 | Nikoonahad | G01N 21/94 356/237.2 |
| 7,849,423 | B1 * | 12/2010 | Yenikaya | G03F 1/36 716/55 |
| 2007/0143733 | A1 * | 6/2007 | Zach | G03F 1/144 716/52 |
| 2007/0177799 | A1 | 8/2007 | Tyurina | |
| 2008/0162061 | A1 * | 7/2008 | Miyano | G01N 21/95607 702/70 |
| 2011/0090352 | A1 | 4/2011 | Wang et al. | |
| 2011/0128407 | A1 | 6/2011 | Lelescu et al. | |
| 2013/0227500 | A1 | 8/2013 | Sakajiri et al. | |
| 2014/0253781 | A1 * | 9/2014 | Gill | G02B 5/1842 348/335 |

OTHER PUBLICATIONS

PCT Search Report for International Application No. PCT/US2014/065555 dated Mar. 18, 2015, 11 pages.

\* cited by examiner

*Primary Examiner* — Wesley Tucker
(74) *Attorney, Agent, or Firm* — Suiter Swantz pc llo

(57) ABSTRACT

A moving wafer imaging system processes wafer images to remove motion and focus blur by performing a blind deconvolution to determine an approximate point spread function. The approximate point spread function, estimated image noise and a Gaussian point spread function are used to compute a weighted point spread function. The weighted point spread function is used to filter out motion focus blur. Noise is then removed with a low-pass filter.

17 Claims, 2 Drawing Sheets

MOTION AND FOCUS BLUR REMOVAL FROM PATTERN IMAGES

PRIORITY

The present application claims the benefit under 35 U.S.C. §119(e) of U.S. Provisional Application Ser. No. 61/904,366, filed Nov. 14, 2013, which is incorporated herein by reference.

FIELD OF THE INVENTION

The present invention is directed generally toward wafer inspection, and more particularly toward removing error from a wafer inspection process.

BACKGROUND

As the demand for semiconductor devices increases the need for improved handling of semiconductor characterization data also increases. Wafer inspection data is commonly acquired via optical inspection tools from one or more wafer processing tools of semiconductor device fabrication lines. This acquired inspection data may be used to track the quality of fabricated semiconductor devices at each step of the semiconductor device production process, allowing a user to reject sub-standard devices and/or adjust the fabrication process in order to bring subsequently process devices within a selected tolerance level. The volume of wafer processing is generally very large and in-line inspection tools must accommodate wafers moving at speed.

In all systems (tools) used for defect detection and defect classification the wafer is aligned to one or both axes of the stage prior to making any measurements on the wafer. To be able to align the wafer, pattern matching is performed between a unique feature in the field of view and a template saved in the recipe.

To be able to perform a successful pattern match between a template and a unique feature on a wafer that is in the field-of-view, the stage should not be in motion and the wafer should be in focus so that a good quality image can be acquired. Stage motion and focusing the wafer are typically done sequentially.

Images collected when stage move is still in progress or is settling after the end of a move have both motion and focus blur. Such images cannot be used for pattern matching.

Consequently, it would be advantageous if an apparatus existed that is suitable for removing motion and focus blur from wafer inspection images.

SUMMARY

Accordingly, the present invention is directed to a novel method and apparatus for removing motion and focus blur from wafer inspection images.

In at least one embodiment, a process for removing motion and focus blur from a wafer image includes performing a blind deconvolution to determine an approximate point spread function. The approximate point spread function, estimated image noise, and a Gaussian point spread function are used to compute a weighted point spread function. The weighted point spread function is used to filter out motion focus blur.

In another embodiment, a moving wafer imaging system processes wafer images by applying a Weiner filter with a weighted point spread function and a low-pass filter to remove noise. The weighted point spread function is based on an approximate point spread function, a Gaussian point spread function, and estimated image noise.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Embodiments of the present invention may allow images of a wafer, taken while the wafer is in motion and before the imaging device is focused, to be used in pattern matching. An image is captured of a moving wafer, before the wafer is settled and the imaging device is completely focused. The image is then processed via a weighed deconvolution based on estimated image noise, a Gaussian point spread function, and an approximate point spread function.

A unique feature is chosen during recipe train time and is saved in the recipe as the template to use for pattern matching. The template is saved in the recipe using wafer co-ordinates. The template can also be a synthetic image that is generated offline and saved in the recipe. When a synthetic image is used as the template, the original co-ordinates determined during train time are used to navigate to the location where the pattern match is performed.

Figure 1:
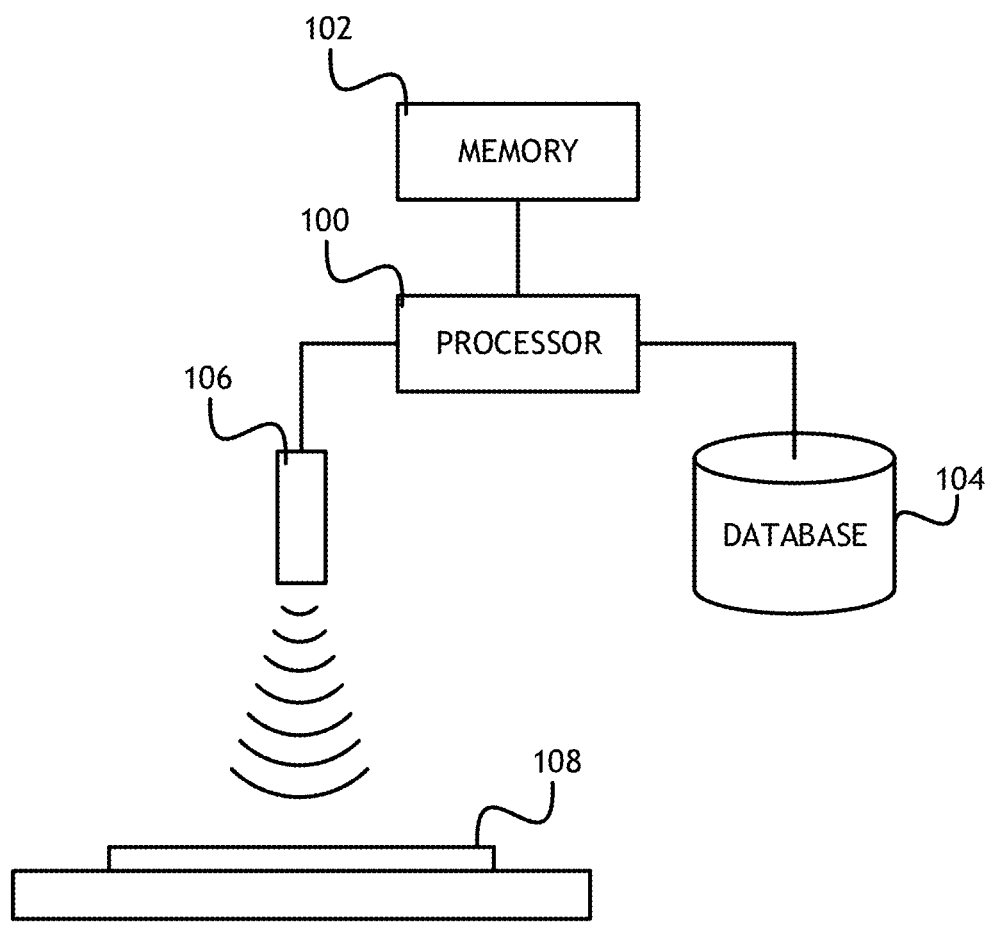
FIG. 1 shows a block diagram of an in-line wafer inspection system suitable for implementing embodiments of the present invention.

Referring to FIG. 1, a block diagram of an in-line wafer inspection system suitable for implementing embodiments of the present invention is shown. A system according to embodiments of the present invention may include a processor 100 configured for digital image processing. The processor 100 may be part of a larger wafer imaging system or incorporated into a wafer imaging device 106. The wafer imaging device 106 may be configured to brightfield or darkfield inspection, or any other suitable wafer image inspection process.

In at least one embodiment, a processor 100 executing computer executable program code stored in a memory device 102 may receive a wafer image from a wafer imaging device 106. The wafer imaging device 106 images moving wafers 108. Movement of the wafer 108 and minor variations in focus of the wafer imaging device 106 may cause blurring in the resulting image. The processor 100 may process the resulting images to remove or mediate motion and focus blur.

Figure 2:
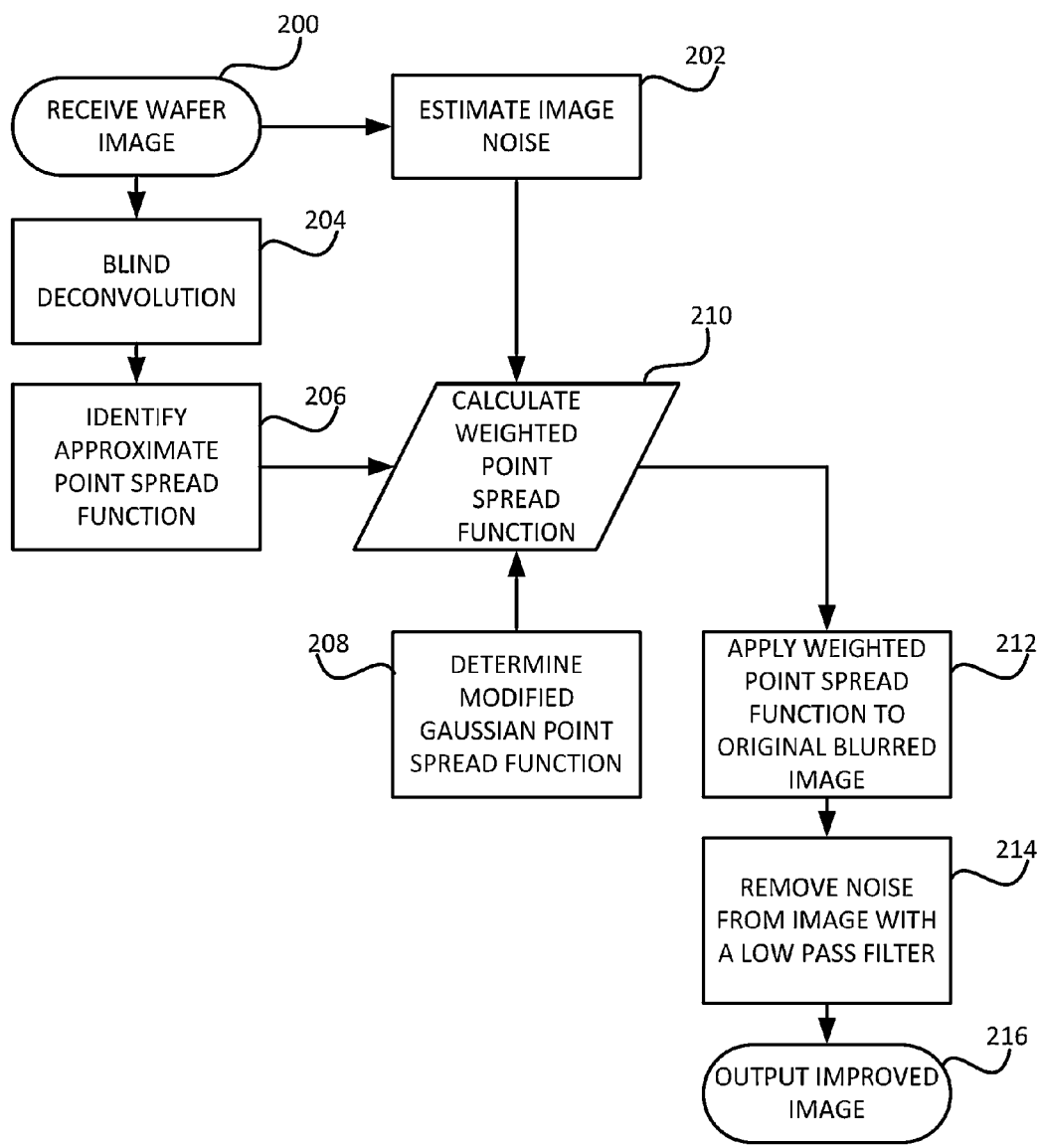
FIG. 2 shows a flowchart of a method for wafer inspection according to at least one embodiment of the present invention.

Referring to FIG. 2, a flowchart of a method for wafer inspection according to at least one embodiment of the present invention is shown. Once a stage has reached a location, before the stage settles, where pattern match is to be performed, the stage co-ordinates are saved in a log. The saved location may be used as the starting point for navigation to the next die.

In at least one embodiment, an image processing system receives 200 blurred images of a moving wafer and processes the image to remove motion and focus blur.

In at least one embodiment, the image processing system estimates 202 image noise. In one embodiment, image noise estimation 202 may be based on known properties of the fabrication process. For example, known properties of the fabrication process may include the speed of the wafer. In another embodiment, image noise estimation 202 may be based on known properties of the environment, such as light levels. In another embodiment, image noise estimation 202 may be based on known properties of the imaging system, such as inherent qualities of the imaging device; noise level data accumulated over a period of use; or any other noise relevant factors.

In at least one embodiment, the image processing system also performs 204 a blind deconvolution on the blurred image. Deconvolution is an algorithm-based process used to reverse the effects of convolution on recorded data. Blind deconvolution refers to a deconvolution process without explicit knowledge of the point spread function (impulse response function) that caused the convolution. In at least one embodiment, based on the blind deconvolution, the image processing system identifies 206 an approximate point spread function.

A point spread function describes the response of an imaging system to a point source or point object. The point spread function may be thought of as the extended optical representation of an unresolved object in an image. In functional terms the point spread function is the spatial domain version of the transfer function of the imaging system. It is noted herein that the point spread function is a useful concept in Fourier optics, astronomical imaging, electron microscopy and other imaging techniques such as 3D microscopy (e.g. confocal laser scanning microscopy) and fluorescence microscopy. The degree of spreading of the point object is a measure for the quality of an imaging system. In non-coherent imaging systems such as fluorescent microscopes, telescopes, or optical microscopes, the image formation process is linear in power and described by linear system theory such that when two objects are imaged simultaneously, the result is equal to the sum of the independently imaged objects. The image of a complex object can then be seen as a convolution of the true object and the point spread function. However, when the detected light is coherent, image formation is linear in the complex field. Recording the intensity image then can lead to cancellations or other non-linear effects.

In at least one embodiment, the image processing system may determine 208 a modified Gaussian point spread function. The modified Gaussian point spread function may be a normalized statistical representation of the blur caused by the point spread function.

In at least one embodiment, the image processing system may calculate 210 a weighted point spread function based on at least one of the estimated image noise, the approximate point spread function, and the modified Gaussian point spread function. In at least one embodiment, the image processing system may apply predetermined weights to each of the components or dynamically determine weights based on features of the imaging system and wafer processing system that favor certain components over others. In at least one embodiment, the image processing system may then apply 212 a Weiner filter based on the weighted point spread function to deconvolve the original image. In signal processing, a Wiener filter is a filter used to produce an estimate of a desired random process by linear time-invariant filtering of an observed noisy process, assuming known stationary signal and noise spectra, and additive noise. A Wiener filter minimizes the mean square error between the estimated random process and the desired process.

In at least one embodiment, the image processing system may remove 214 noise from the deconvolved image with a low-pass filter, and output 216 the improved image.

Embodiments of the present invention reduce wafer alignment time because an image can be acquired before a stage has settled and the imaging device is focused, increasing the throughput of the wafer processing tool. The method can also be used in cases where the image is not focused completely due to incorrect focus calibration.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A semiconductor wafer inspection method comprising:
performing an image capture of a moving wafer with a wafer imaging device;
calculating, with a processor, a weighted point spread function based on a Gaussian point spread function defining a statistical distribution of blur derived from a point source; and
performing, with the processor, a deconvolution on the image based on the weighted point spread function.

2. The method of claim 1, wherein the deconvolution comprises applying a Weiner filter.

3. The method of claim 1, further comprising applying, with the processor, a low-pass filter to remove noise.

4. The method of claim 1, wherein the weighted point spread function comprises the approximate point spread function, the approximate point spread function being derived by a blind deconvolution.

5. The method of claim 1, wherein the weighted point spread function further comprises the approximate point spread function, the approximate point spread function being derived by a blind deconvolution.

6. The method of claim 1, further comprising pattern matching the deconvolved image to a template.

7. A wafer inspection system comprising:
a processor;
a wafer imaging device connected to the processor; and
computer executable program code configured to instruct the processor to:
perform an image capture of a moving wafer with the wafer imaging device;
calculate a weighted point spread function based on a Gaussian point spread function defining a statistical distribution of blur derived from a point source; and
perform a deconvolution on the image based on the weighted point spread function.

8. The wafer inspection system of claim 7, wherein the deconvolution comprises applying a Weiner filter.

9. The wafer inspection system of claim 7, wherein the computer executable program code is further configured to instruct the processor to apply a low-pass filter to remove noise.

10. The wafer inspection system of claim 7, wherein the weighted point spread function comprises the approximate point spread function, the approximate point spread function being derived by a blind deconvolution.

11. The wafer inspection system of claim 7, wherein the weighted point spread function further comprises the approximate point spread function, the approximate point spread function being derived by a blind deconvolution.

12. The wafer inspection system of claim 7, wherein the computer executable program code is further configured to instruct the processor to pattern match the deconvolved image to a template.

13. A computer apparatus for processing semiconductor wafer images comprising:
a processor;
memory connected to the processor;
a data storage element connected to the processor;
a wafer imaging device connected to the processor; and
computer executable program code, stored in the memory, configured to instruct the processor to:
perform an image capture of a moving wafer with the wafer imaging device;
calculate a weighted point spread function based on a Gaussian point spread function defining a statistical distribution of blur derived from a point source; and
perform a deconvolution on the image based on the weighted point spread function.

14. The computer apparatus of claim 13, wherein the deconvolution comprises applying a Weiner filter.

15. The computer apparatus of claim 13, wherein the computer executable program code is further configured to instruct the processor to apply a low-pass filter to remove noise.

16. The computer apparatus of claim 13, wherein the weighted point spread function further comprises the approximate point spread function, the approximate point spread function being derived by a blind deconvolution.

17. The computer apparatus of claim 13, wherein the computer executable program code is further configured to instruct the processor to pattern match the deconvolved image to a template stored in the data storage element.

* * * * *